Sept. 15, 1936. E. C. LONG 2,054,089
PISTON FOR INTERNAL COMBUSTION MOTORS
Filed June 21, 1933
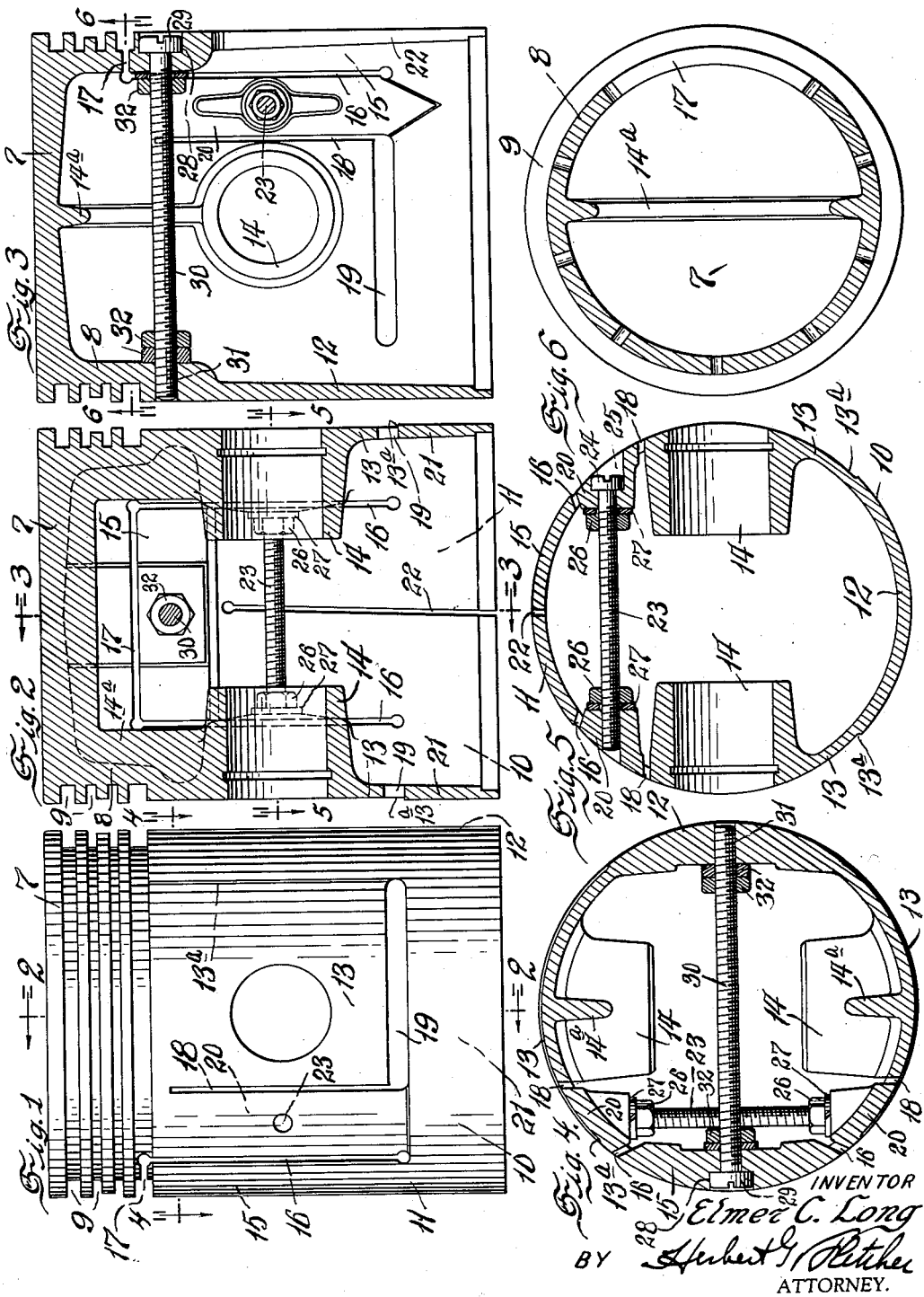
INVENTOR
Elmer C. Long
BY Hubert G. Ritcher
ATTORNEY.

Patented Sept. 15, 1936

2,054,089

UNITED STATES PATENT OFFICE 2,054,089

PISTON FOR INTERNAL COMBUSTION MOTORS

Elmer C. Long, Grosse Pointe Park, Mich.

Application June 21, 1933, Serial No. 676,939

14 Claims. (Cl. 309—12)

This invention relates to new and useful improvements in a piston for internal combustion motors and pertains more particularly to that class of pistons having means for preventing normal expanding action of the skirt when the head of the piston expands.

One of the objects of the invention is to provide a tying member disposed parallel to the pin boss axis of the piston and engaged at its ends with opposing parts of the skirt for staying opposing skirt sides against outward movement with the pin bosses when the pin bosses are moved outwardly by expansion of the head.

Another object of the invention is in providing a piston with an improved arrangement of adjusting means in the skirt for adjusting or expanding the piston due to wear, so that the cylinder bearing parts of the skirt can be given its original diameter.

Other and further objects will appear in the specification and be specifically pointed out in the appended claims, reference being had to the accompanying drawing, exemplifying the invention, and in which:—

Figure 1 is a pin boss side elevation of this improved piston.

Figure 2 is a vertical sectional view taken approximately on the line 2—2 of Fig. 1.

Figure 3 is a vertical sectional view taken approximately on the line 3—3 of Fig. 2.

Figure 4 is a horizontal sectional view taken approximately on the line 4—4 of Fig. 1.

Figure 5 is a horizontal sectional view taken approximately on the line 5—5 of Fig. 2.

Figure 6 is an inverted horizontal sectional view taken approximately on the line 6—6 of Fig. 3.

The improved piston comprises a head 7 having a side wall 8 in which packing ring recesses 9 are formed, and depending from the side wall of the head is a skirt 10 having a compression thrust side 11, a power thrust side 12 and pin boss sides 13 each carrying a pin boss 14. Joining the pin bosses, the pin boss sides and the head, is a rib 14a.

The compression thrust side of the skirt is provided with an inverted tongue portion 15, said tongue portion being formed by a pair of longitudinal slots 16 extending from the lower-most packing ring recess 9 to a plane beneath the pin bosses, and said slots are joined at their upper ends by a transverse slot 17.

The pin boss sides 13 of the piston on their outer peripheries are each relieved or inset for an equal distance on each side of the vertical pin boss axis, as shown at 13a in Figs. 1 and 4, and for a distance downwardly from the horizontal axis of the pin bosses to a horizontal plane with the lower extending ends of the slots 16, as shown in Figs. 1 and 2.

Formed in each pin boss side adjacent respective slots 16 is a paralleling slot 18, the lower end of each slot 18 joining with a respective transverse slot 19 which is formed on a plane with the lower ends of the slots 16 and beneath respective pin bosses, each pair of paralleling slots 16 and 18 forming a downwardly extending leg 20, each leg 20 being for the support of respective cylinder bearing portions 21 of the skirt formed beneath respective pin bosses and the tongue portion 15 or compression thrust side 11 of the skirt. The compression thrust side 11 of the piston is provided with a longitudinal slot 22 which extends from the open end of the piston for a distance upwardly into the tongue portion 15 of said thrust side, and connected at its ends to respective legs 20 is a threaded steel tie bolt 23.

The bolt at one end is threadingly engaged in on of the legs 20 and at its opposite end having its head 24 engaged in a counter-sink 25 formed in the other leg, said bolt being securely held in position by lock nuts 26 engaging respective lock washers 27 in abutment with respective legs 20.

The tie bolt 23 is shown as being disposed in an approximate horizontal plane with the pin boss axis, but if desired, this position of location can be changed above or below the pin boss axis, the purpose of said tie bolt being to limit the outward movement if any, of the depending ends of the legs 20 when the head 1 expands across the pin boss diameter during operation of the piston.

The upper end of the tongue portion 15 on the compression thrust side 11 of the skirt 10 is provided with a counter-sunk seat 28, said seat being for the reception of the head 29 of a threaded steel tie bolt 30 which is passed through the tongue portion and is threadingly engaged at 31 in the power thrust side 12 of the skirt, said tie bolt being held in adjusted position by lock nuts 32 which are mounted on the tie bolt.

Obviously, the tongue portion 15 of the compression thrust side 11 of the skirt and the longitudinal slot 22 extending into the tongue, provides a resiliently flexible thrust side in the skirt particularly when the piston is made from an aluminum alloy. The power thrust side 12 it is to be noted, is unslotted and is integrally connected with the side wall of the head, thus providing a solid thrust side. The connection of the tie bolt 30 with the resiliently flexible compression thrust side and the solid power thrust side therefore provides a strut from the power thrust side 12 to the compression thrust side 11 for holding the diameter of the skirt across the thrust sides 11 and 12.

In the operation of this piston in its cylinder, as the head expands particularly across the pin boss diameter, the clearance or relief provided on the pin boss sides 13 is sufficient to prevent engagement of the pin boss sides with the cylinder wall and as the legs 20 are free from engagement with the pin bosses 16 and/or the pin boss sides 13, the steel tie bolt 23 by reason of having a less co-efficient of expansion than the material of the piston, will hold the legs 20 from spreading outwardly at the expanding ratio of the head.

As the depending ends of the legs 20 respectively connect cylinder bearing portions 21 which extend from the power thrust side 12 beneath the pin bosses to the compression thrust side 11 of the skirt, the limited outward movement or holding in movement of the tie bolt 23 will consequently be active on the cylinder bearing portions 21 for preventing the portions 21 from being moved too far outwardly against the cylinder wall, relief for this holding in movement of the portions 21 being provided by the longitudinal slot 22 on the compression thrust side 11 of the skirt.

The peculiar slotting of the skirt of this piston it is to be noted, provides a cylinder bearing skirt for the piston which is resiliently flexible on all sides except the power thrust side; therefore the limited holding in movement of the tie bolt 23 will be circumferentially active on approximately three-fourths of the cylinder bearing circumference of the skirt during expansion of the piston.

The tie bolts 23 and 30 of this piston provide means for taking up the wear of the cylinder bearing portions of the skirt by manipulation of said tie bolts for positioning the skirt to its approximate original diameter.

Obviously constructional modifications of the device are possible without departing from the spirit of the present invention and therefore it is to be understood that it is not necessary to limit the invention by the terms used in the foregoing description, excepting such as the state of the art may require.

What I claim is:—

1. A piston having a head, a skirt, said skirt comprising pin boss sides separated at their lower ends with portions of the skirt therebelow and opposed thrust sides, said skirt being slotted on one of its thrust sides, a pin boss carried on each pin boss side of the skirt, a vertical leg formed in each pin boss side extending from the head to lower parts of the skirt and being separated from a respective pin boss, and a tie member of different material than the skirt having its ends fixed in respective legs.

2. A piston comprising a head, a skirt having opposed thrust sides and pin bosses, said skirt being slotted on one of its thrust sides, a leg depending from the head to lower parts of the skirt at each end of said slotted thrust side, said legs being free from engagement with the pin bosses, and a tie member of different material than the skirt having its ends secured to respective legs.

3. A piston comprising a head, a skirt having opposed thrust sides and pin bosses extending from the skirt, the skirt being longitudinally slotted intermediate its length on one thrust side to form a pair of legs, that portion of the skirt between said legs on the slotted thrust side being disconnected from the head, and a tie member paralleling the pin bosses and having its ends secured to respective legs.

4. A piston comprising a head, a skirt having opposed thrust sides and pin bosses extending from the skirt, the skirt being longitudinally slotted intermediate its length on one thrust side to form a pair of legs, that portion of the skirt between said legs on the slotted thrust side being disconnected from the head to form a tongue shaped portion, said tongue shaped portion being slotted to provide yieldability, and a tie member paralleling the pin bosses and having its ends secured to respective legs.

5. A piston for an internal combustion motor comprising a head having a side wall, a skirt having a pair of thrust sides, one of said thrust sides being formed continuous with the side wall of the head and the other thrust side having a part disconnected from the side wall of the head, a vertical leg formed in the wall of the skirt on each side of said disconnected part thereof, said legs extending from the side wall of the head to lower parts of the skirt, and a tie member of material different than the piston fixed at its ends to respective legs.

6. A piston for an internal combustion motor comprising a head having a side wall, a skirt continuous with the side wall of the head on one side and having a resiliently flexible part on its opposite side, pin bosses, a leg formed in the wall of the skirt on one side of each pin boss, said legs extending from the side wall of the head to lower parts of the skirt and being free from engagement with the pin bosses, intermediate their length, and a tie member paralleling the pin bosses having its ends fixed in respective legs.

7. A piston for an internal combustion motor comprising a head having a side wall, a skirt continuous with the side wall of the head on one side and having a resiliently flexible part on its opposite side, pin bosses, a leg depending from the side wall of the head between each pin boss and said flexible part of the skirt, said legs being connected to the lower part of the skirt and being free from engagement with the pin bosses, and a tie member of material different than the skirt being fixed at its ends to said legs.

8. A piston for an internal combustion motor comprising a head having a side wall, a skirt continuous with the side wall of the head on one side and having a slotted part disconnected from the side wall of the head on its opposite side, pin bosses extending from the skirt, a pair of legs forming a part of the skirt depending from the side wall of the head for the support of said separated skirt side, said legs being free from engagement with the pin bosses, and a tie member of different expansion co-efficient from the piston fixed at its ends to said legs.

9. A piston for an internal combustion motor comprising a head having a side wall and pin bosses depending from the side wall, a skirt continuous with the side wall of the head on one side and having a resiliently flexible part disconnected from the side wall of the head on its opposite side, a leg adjacent each pin boss depending from the side wall of the head for the support of said separated skirt side, said legs being free from engagement with the pin bosses, and a tie member of material different from the piston fixed at its ends to said legs.

10. A piston for an internal combustion motor comprising a head, a skirt, the skirt having a pair of thrust sides and a pair of pin boss sides, one of said thrust sides being resiliently flexible, a pair of legs free from engagement with the pin bosses depending from the head for the support of the resiliently flexible thrust side, an adjustable tie member secured at its ends to respective thrust sides, and a second adjustable tie member secured at its ends to respective legs.

11. A piston for an internal combustion motor comprising a head and a skirt, said skirt having a pair of opposed thrust sides, one of which is resiliently flexible, pin bosses extending from the skirt, a pair of legs forming part of the skirt extending from the head to the lower end of the flexible thrust side, said legs being free from engagement with the pin bosses, and a pair of transverse tie members of material different from the piston fixed at their ends to respective parts of the skirt, one of said tie members connecting the thrust sides and the other tie member connecting said legs adjacent the pin bosses.

12. A piston comprising a head and a skirt having opposed thrust sides, said skirt having one of its thrust sides longitudinally slotted and separated from the head, pin bosses, legs formed in the skirt and being free from engagement with the pin bosses, a tie member paralleling the pin bosses and having its ends secured to respective legs, said legs depending from the head to lower parts of the skirt for supporting said separated thrust side, and a transverse slot formed in the skirt extending from each leg beneath a respective pin boss.

13. A trunk type piston having a full skirt and pin bosses extending from the skirt and a flexible part formed in one of the skirt thrust sides which is separated from the head, a leg formed in the skirt on each side of the flexible part and separated therefrom, a tie member having its ends secured to respective legs, and an L shaped slot in the skirt on each pin boss side in opposing relation from each other.

14. A trunk type piston having a full skirt and pin bosses extending from the skirt and a flexible part formed in one of the skirt thrust sides which is separated from the head, a leg formed in the skirt on each side of the flexible part and separated therefrom, a tie member paralleling the pin bosses and having its ends secured to respective legs, and an L shaped slot in the skirt on each pin boss side in opposing relation from each other and disposed so that the horizontal bar of each slot extends beneath a respective pin boss.

ELMER C. LONG.